United States Patent [19]

Doerman et al.

[11] Patent Number: 4,696,358
[45] Date of Patent: Sep. 29, 1987

[54] WEIGHING A NUMBER OF OBJECTS IN SUCCESSION

[76] Inventors: Eryk S. Doerman, 45 Cromwell Road, London SW7 2ED; William J. Turner, 83 Twyford Road, Harrow, Middlesex HA2 0SJ; David A. Homer, 35 Keble Road, Maidenhead, SL6 6BB; Andrew D. G. Stewart, The Old Rectory, Ashampstead, Reading, Berkshire; Ian Clarke, 63 High Street, Thames Cottage, Wargrave, Berkshire, all of England

[21] Appl. No.: 798,298

[22] Filed: Nov. 15, 1985

[30] Foreign Application Priority Data

Nov. 16, 1984 [GB] United Kingdom ............... 8428976

[51] Int. Cl.$^4$ ................... G01G 19/00; G01G 23/00; G01N 3/08
[52] U.S. Cl. ................... 177/145; 177/161; 73/12
[58] Field of Search ............. 73/12, 861.73; 177/145, 177/161

[56] References Cited

U.S. PATENT DOCUMENTS 3,545,611 12/1970 Husome .
3,805,904 4/1974 Zimmerer .

FOREIGN PATENT DOCUMENTS

| 2412258 | 9/1975 | Fed. Rep. of Germany ... 73/861.73 |
| 2947414 | 5/1981 | Fed. Rep. of Germany ... 73/861.73 |
| 1396747 | 6/1975 | United Kingdom . |
| 2026176 | 1/1980 | United Kingdom . |
| 1575839 | 10/1980 | United Kingdom . |
| 2068124 | 8/1981 | United Kingdom . |

Primary Examiner—George H. Miller, Jr.
Attorney, Agent, or Firm—Kerkam, Stowell, Kondracki & Clarke

[57] ABSTRACT

To weigh objects in quick succession, the objects are projected with a known horizontal velocity onto a ramp which has a surface which curves down through 90°. The ramp can move horizontally in response to the impulse corresponding to the change in horizontal momentum of the object. A transducer senses the movement of the ramp and the output horizontal velocity of the object is sensed, enabling the change in horizontal velocity to be calculated. The mass of the object is calculated from the horizontal movement of the ramp and the change in horizontal velocity of the object. In order to obtain accurate sensing of the movement of the ramp, the transducer is a linear variable differential transformer having a primary winding energized by a cyclical carrier signal and two matched secondary windings in series; the secondary winding output signal is rectified to a corresponding DC voltage having ripple components, and a sample is taken of the signal at the zero voltage of the principal ripple component.

26 Claims, 13 Drawing Figures

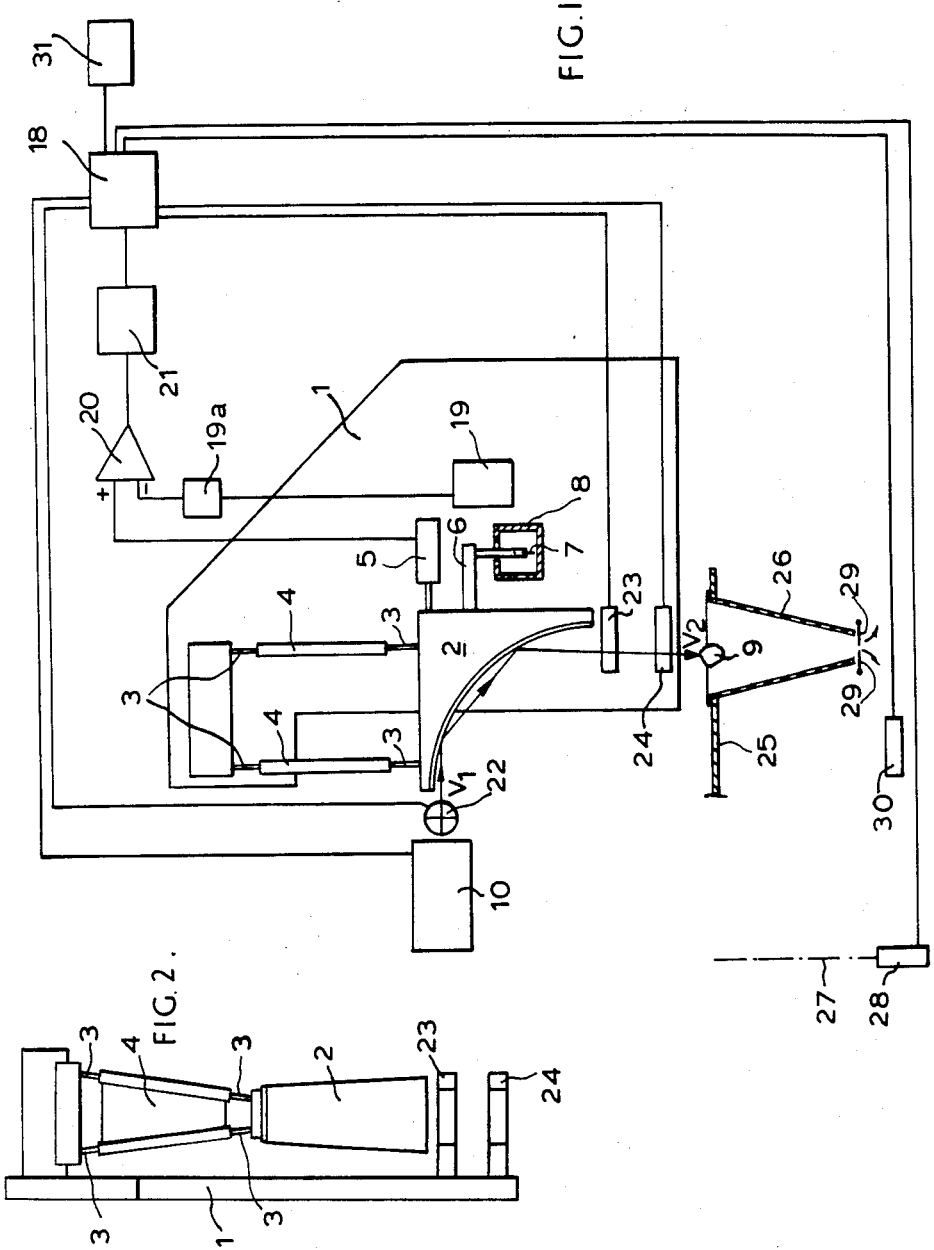

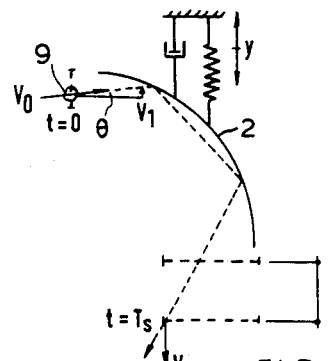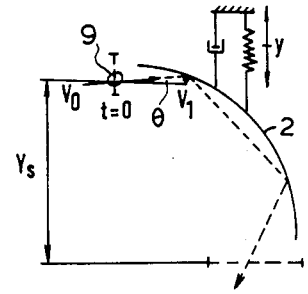
FIG. 9.   FIG. 10.
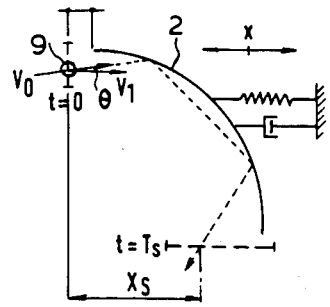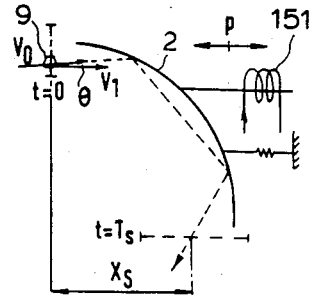
FIG. 11.   FIG. 12.
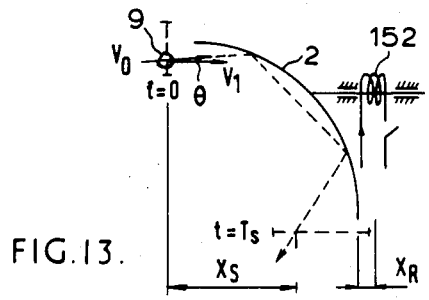
FIG. 13.

WEIGHING A NUMBER OF OBJECTS IN SUCCESSION

BACKGROUND OF THE INVENTION

The present invention relates to apparatus for, and a method of, weighing a number of objects in succession, particularly in rapid succession. The intention is to provide weighing operations which do not require high accuracy, such as sorting objects into weight bands.

THE INVENTION

In the apparatus of the invention, there is a reaction member, means for directing each object in succession onto the reaction member, and means for giving a signal which varies with the dynamic reaction of the reaction member to the impact thereon of the object. In the method of the invention, each object of a number of objects in succession is directed in turn to a reaction member, giving a signal which varies with the dynamic reaction of the reaction member to the impact thereon of the object, and thereby deriving a signal representative of the mass of the object.

The term "weighing" is used although it is the mass that is determinative. The technique is to cause the object to interact with the reaction member, a known body, and to deduce the mass (weight) from the change in motion of the object and change in motion of the reaction member or force thereon, by applying the principle that the force on the object equals the product of its mass and acceleration. The technique is a dynamic technique and not a static technique.

The invention is particularly useful for weighing objects in rapid succession; provided the objects are sufficiently separated so that they pass through the apparatus one after the other, they can be as close as desired. The apparatus of the invention can be relatively cheap and simple.

The invention is particularly suitable for weighing operations which do not require high accuracy, such as sorting the objects into weight bands. It is possible to weigh objects having a range of weights, for instance extending from a first weight to a second weight equal to the first weight plus 10%; thus the invention is not just applicable to check weighing, where the objects are expected to have a weight very close to a predetermined weight. The invention can be used to weigh objects having a weight of up to for instance 5 gms, but there is no theoretical upper limit; or to weigh objects having weights down to for instance 0.2 mg, the lower limit being determined by the resolution of the apparatus, so again there is no theoretical lower limit if the apparatus is sufficiently sensitive. The invention could be applied to pharmacy. e.g. tablet weighing, or to weighing gem stones, for instance diamonds. In gem stone terminology, 1 carat (C)=0.2 gms and 1 point=0.01C. The invention is useful for weighing relatively light-weight rough or sawn gem stones in the range of 1–60 points, though it can also be useful for weighing stones having weights up to for instance 1 C or more if accurate weighing is not required.

Although the apparatus has means for giving a signal which varies with the movement of or with the force applied to the reaction member and preferably also has means for giving a signal corresponding to the change in velocity of the object, it is not necessary that the actual values be determined, provided a suitable input is given for calculating the mass of the objects. Likewise, the actual mass of the object need not be calculated, though it would be normal to do so—for instance, the invention may merely give a signal indicating the route to be followed by the object, for sorting the object into one of a number of specific weight bands. In practice, the input and output velocities in a specific direction will vary and will each be sensed—however in theory at least, the change in velocity could be a fixed value, in which case a velocity change signal giving means could merely be a fixed value inserted e.g. when computing the weight.

The reaction member can take various forms. In the preferred form, the reaction member has a concave surface which curves smoothly through a substantial angle, and the objects are directed on to an initial part of the concave surface so that each object is guided through an angle by the concave surface.

It is most convenient to have the concave surface curve through 90°; the change in velocity can be measured in a specific direction parallel to the initial direction and the final velocity (in this direction) would be zero or close to zero. If the object slides around the concave surface, the final velocity will be zero in said specific direction. If however the object bounces, there may be a relatively small final velocity in the said direction; to take account of this, an array of sensors can be positioned adjacent the far end of the concave surface, for determining the resultant velocity (speed and direction) of the object as it leaves the surface, or more simply first its component of velocity in said specific direction. In general terms, the advantages of the object being weighed whilst it is still moving are that the throughput is high and that the object is still moving when it leaves the reaction member, so that it is automatically removed from the weighing apparatus and can pass on for further evaluation, packaging, grouping or storage. The apparatus can thus be designed so that it can be in a path of travel of the objects, the objects being weighed without stopping. It is convenient to project the objects horizontally onto the concave surface and have the concave surface curve downwards so that there is no possibility of an object lodging on the concave surface.

DESCRIPTION OF PREFERRED EMBODIMENT

The invention will be further described, by way of example, with reference to the accompanying drawings, in which:

FIG. 1 is a side view of an embodiment of the invention;

FIG. 2 is a partial top plan view of the embodiment;

FIGS. 9 to 13 are schematic diagrams illustrating five alternative embodiments.

FIGS. 1–8

Figure 3:
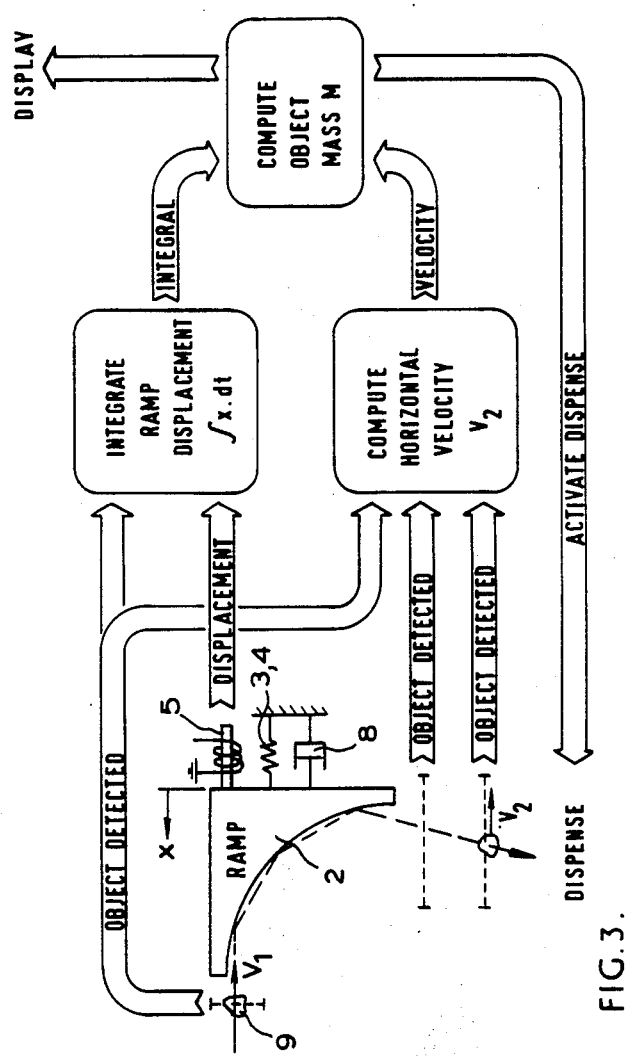
FIG. 3 is a block, schematic diagram of the function of the embodiment.

The apparatus has a back plate 1 from which is suspended a reaction member in the form of a ramp 2 which has a concave surface which curves smoothly downwards through 90°. As shown, the longitudinal section of the concave surface is a quarter circle but it could for instance have a shape which has a sharper curvature at one end than at the other end, e.g. in the form of a quarter-elipse, a parabola, a hyperbola, or any other suitable curved shape, or a shape comprising a combination of curved and straight lines, or a shape formed of one or more straight lines. The initial part of the curve is horizontal and the final part vertical. In cross-section, the curved surface is flat but it may be any suitable channel shape. The ramp 2 is of very light weight and may be formed of any suitable low density engineering material faced with a thin, hard-wearing material (e.g. of magnesium alloy faced with hardened steel—steel is a good material as it has a low coefficient of friction with diamond).

The ramp 2 is suspended by a parallel arm linkage in the form of eight parallel springs 3 of for instance piano wire, with two rigid, light weight, interconnecting arms 4 (a ligament suspension); for small movements, the ramp 2 is thus constrained to move substantially horizontally. An advantage of measuring in the horizontal direction is that gravity does not come into the calculation of weight since it does not affect the horizontal velocity of the object. However, if it is desired to measure in the vertical direction, the ligament suspension can be put at 90°, and the transducer 5 (see below) positioned accordingly; in general terms one can measure in any direction. In theory, the accuracy of the weighing can be improved by simultaneously measuring in two directions at right angles, movement of the ramp 2 being permitted for instance in the horizontal and vertical directions. However, the improvement in accuracy does not justify the increased complexity if the purpose is to sort objects at a high rate into weight ranges.

A displacement transducer 5 is connected between the ramp 2 and the back plate 1, and acts as means for giving a signal which varies with the dynamic reaction of the ramp 2 to the impact thereon of the successive objects. In a stiff system (not shown), the transducer 5 could be a force transducer which acts as means for determining the force in the horizontal direction imparted to the ramp 2. In a soft system (as shown), the horizontal deflection of the ramp could be sensed in a non-contacting manner, e.g. optically or as shown by a linear variable differential transformer. Rigidly secured to the ramp 2, there is an arm 6 carrying a hollow paddle 7 immersed in an oil bath 8, thereby providing oil damping of the movement of the ramp 2. Alternatively electrical damping means could be used.

Directing or feeding means are provided to direct successive objects 9 accurately in a horizontal direction onto the first part of the concave surface of the ramp 2, at a predetermined velocity. The feeding means can be any suitable means, and such means are known. A suitable feeding means is indicated at 10. The objects 9 are delivered as indicated by the arrow $V_1$ in FIG. 1, and leave the feeding means 10 in a horizontal direction, at an input velocity $V_1$ of for instance 2 m/sec (in theory, the velocity should be as high as possible, but in practice is limited by risk of damage to the objects 9 or excessive wear of the ramp 2). The speed of feed is accurately controlled and the feeding means 10 is shown connected to a microprocessor 18 so as to give a signal which represents the horizontal input velocity $V_1$ of the object 9. However, accurate control of the feed is not essential if equipment is included for measuring the input velocity (speed and direction).

To reduce vibration, the feeding means is not mounted on the back plate 1. To compensate for any vibration (background noise) of the back plate 1, a matched conventional accelerometer 19 is mounted on the ramp support base or back plate 1 and its output, suitably conditioned by a modelling circuit 19a, is subtracted at 20 from the signal from the transducer 5 before being passed to the microprocessor 18 via an analogue/digital converter 21. This enables the apparatus to function satisfactorily in most working environments.

Any suitable device can be provided to signal when the object 9 leaves the feeding means 10, primarily to signal the start of a weighing cycle—the preferred device is a split photo-diode detector 22 connected to the microprocessor 18.

Although the input velocity $V_1$ can be taken as horizontal, the output velocity $V_2$ will not necessarily be vertical as the object 9 may bounce around the ramp 2. Thus an arrangement is required which will sense magnitude and direction of the velocity $V_2$ and suitable devices are known. Suitable devices are indicated at 23, 24 and are shown as directly connected to the microprocessor 18.

Below the devices 23, 24, there is a continuously rotating, constant speed carousel 25 (only part is shown) having soft, loose, nitrile rubber pockets 26 and rotating about an axis 27. The carousel motor 28 is controlled by the microprocessor 18 to position a pocket 26 to catch the object 9, and the floppiness of the pocket 26 causes the object 9 to be decelerated and drop lightly onto double swinging flaps 29 at the bottom. The carousel 25 rotates with the object 9 within the pocket 26 and after a certain degree of rotation to allow the object 9 to settle on the flaps 29, the pocket 26 passes over an array of weight-graded receiving bins (not shown); here a signal from the microprocessor 18 causes a respective solenoid cam mechanism 30 to open the flaps 29 and drop the object 9 into the appropriate bin.

OPERATION

The apparatus described above can be used for weighing objects in a nominal weight range of 0.2 mg to 0.2 g. In operation, the horizontal vibration of the ramp 2 is analysed to determine the mass M of each successive object 9, according to the equation:

$$M = \frac{k \int_0^{T_s} x \cdot dt}{V_1 - V_2}$$

where
x is the instantaneous horizontal deflection of the ramp 2;
k is a calibration constant (dependent on e.g. the mass of the ramp 2, its undamped natural frequency (or stiffness of suspension) and the damping factor);
$T_s$ is a time sufficiently long for the ramp 2 to have come to rest after weighing (but before the next weighing).

ELECTRONIC PROCESSING

FIGS. 4 to 8 show a complete purpose designed weighhead printed circuit board on which the analysis referred to above is carried out. It is a six layer board containing about 200 integrated circuits, including a microprocessor and a 'bitslice' device. It is used to carry out video processing and interface with the sensors 23, 24. Functions undertaken include 'boundary tracking', determination of centroid of the object 9 and carrying out calculation for weight. The 'bitslice' device is designed to handle one instruction every 250 nano-secs.

Figure 4:
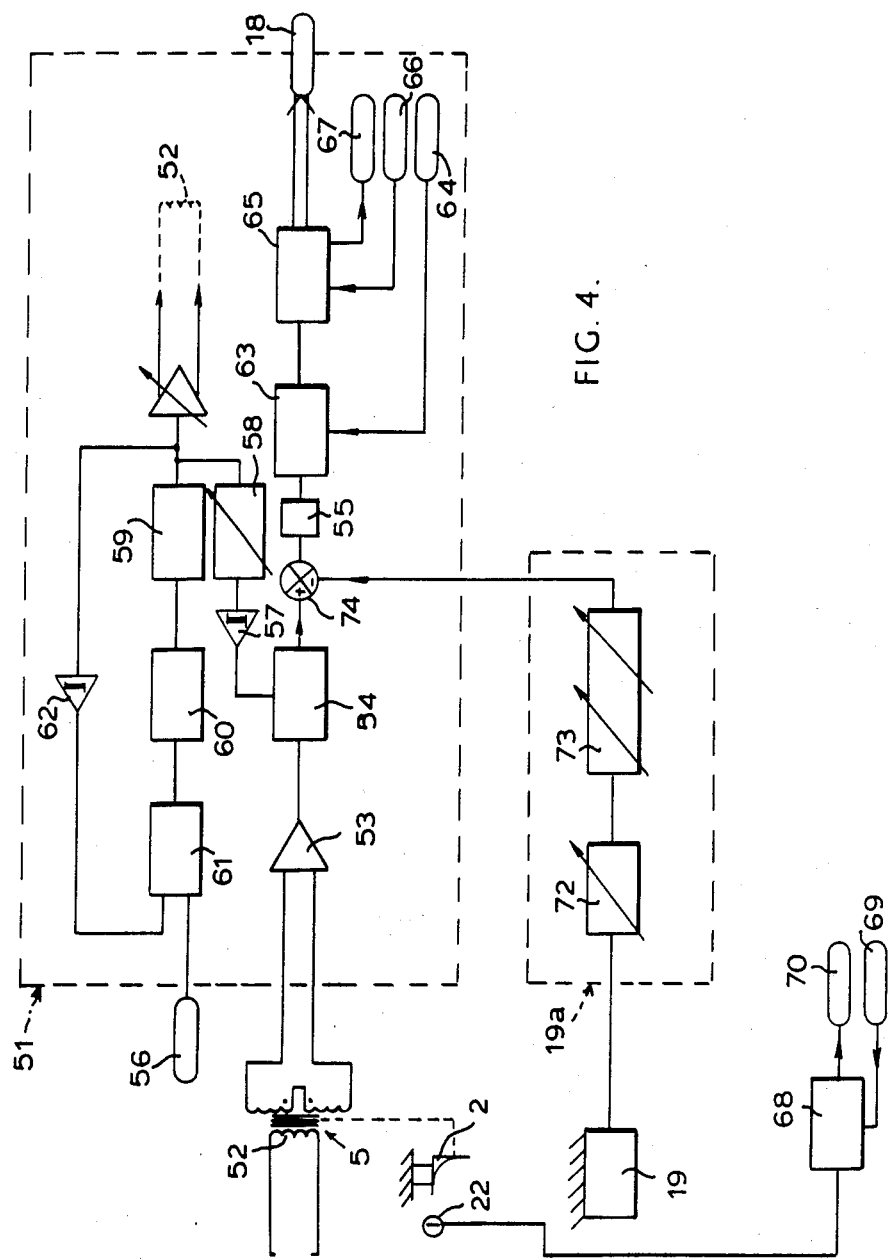
FIGS. 4 to 8 are block diagrams showing a processing system for the apparatus of FIGS. 1 and 2.
Figure 5:
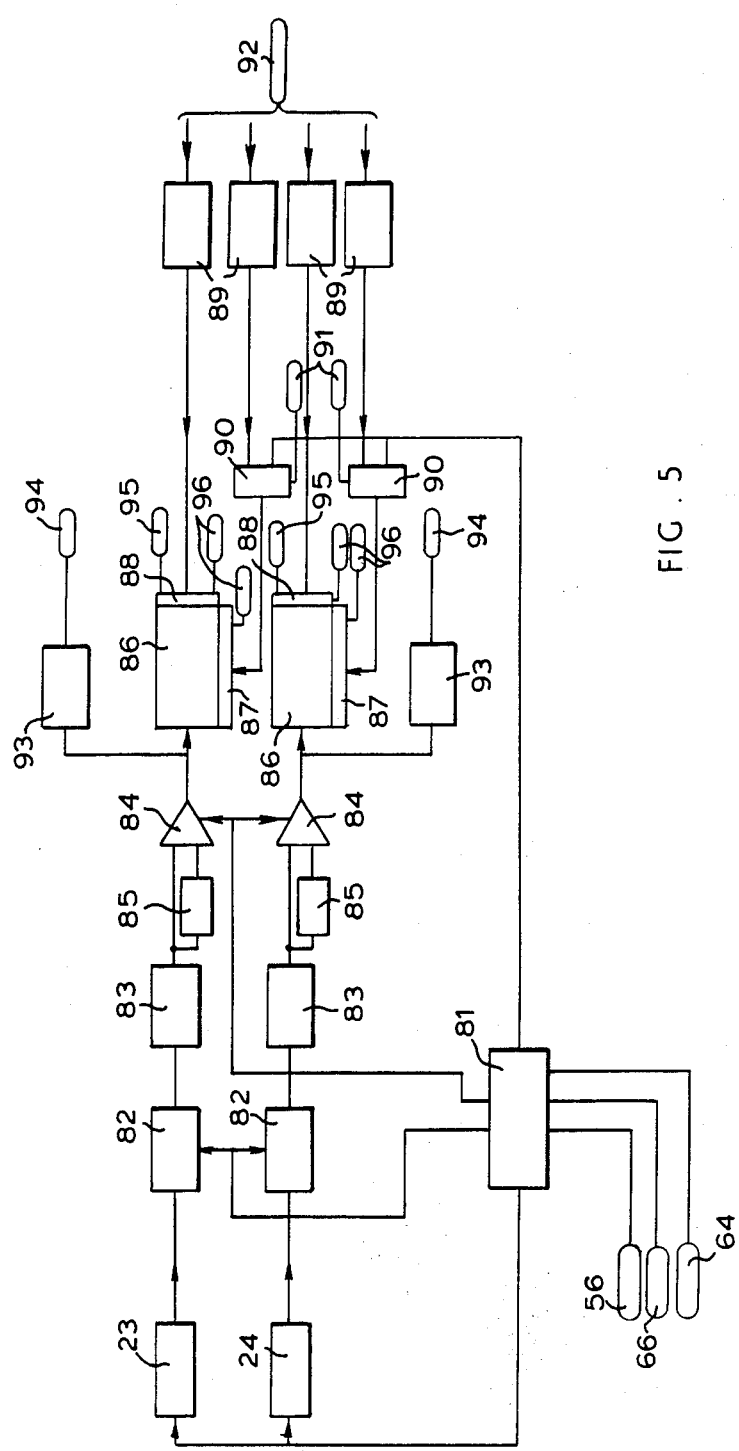
Figure 6:
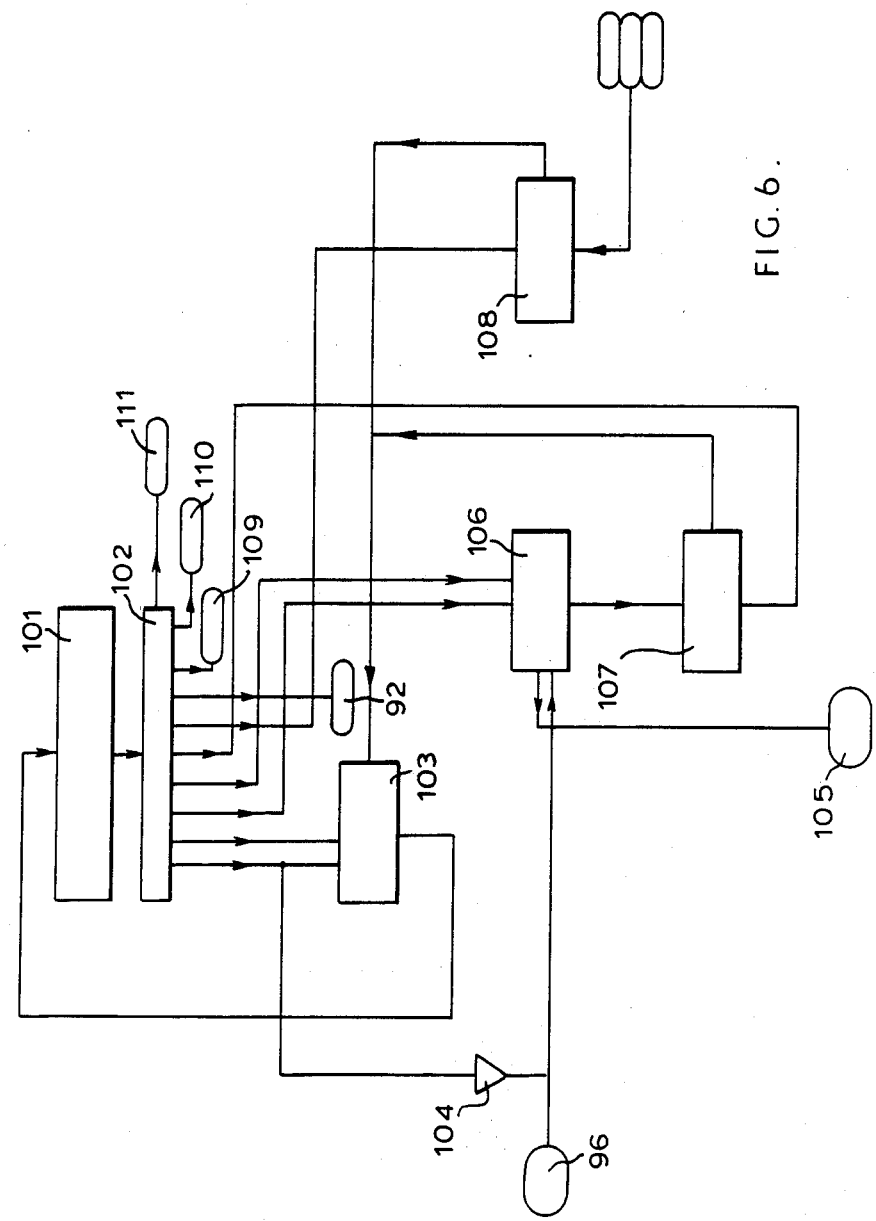
Figure 7:
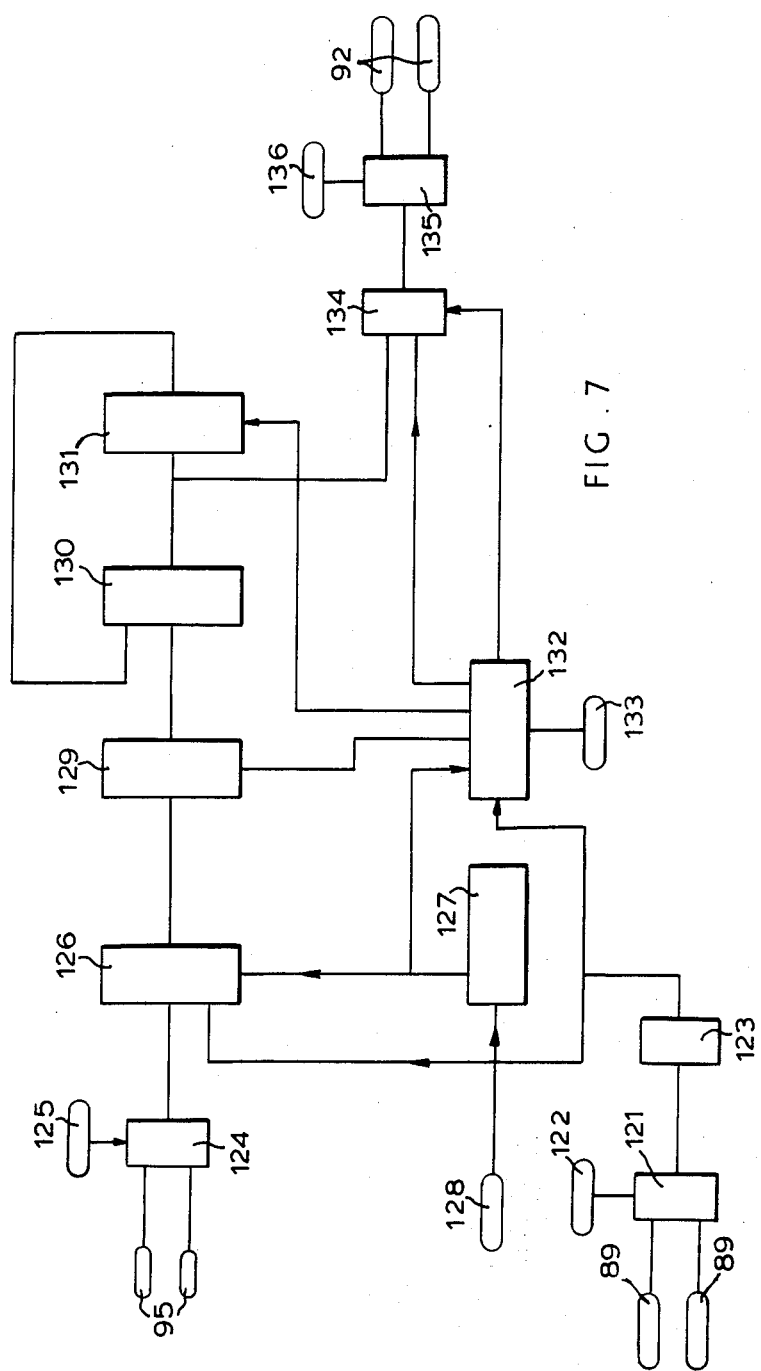
Figure 8:
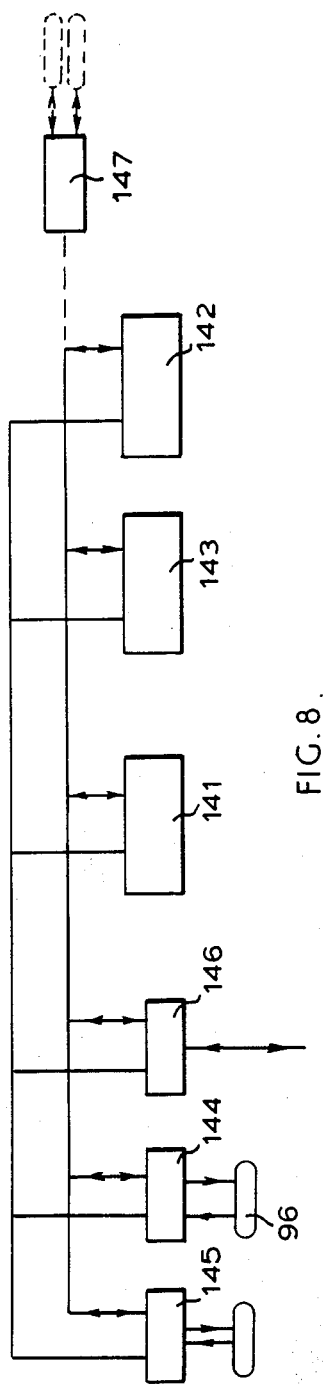

The weigh-head system consists of five general elements:
(i) Linear variable differential transformer interface and ramp simulator (FIG. 4);
(ii) Interface for linear charge coupled optical sensor and video memory (FIG. 5);
(iii) Bitslice processor (FIG. 6);
(iv) Boundary tracker (FIG. 7);
(v) 16 bit processor and associated peripherals (FIG. 8).

FIG. 4

(linear variable differential transformer interface 51 and ramp simulator 19a)

The transducer 5 is a linear variable differential transformer (LVDT), which gives an alternating output voltage proportional to displacement and is used to determine the movement of the ramp 2. The LVDT has a single primary 52 and two matched secondary windings. Movement of the core of the LVDT, which is attached to the ramp 2, causes changes in the voltages induced in each secondary winding. The LVDT primary is energised by a sinewave carrier signal and the resultant sum of anti-phase secondary signals corresponds to the displacement of the ram 2. The phase of the secondary signals determines the direction of this displacement. The displacement signals from the LVDT are amplified at 53 and applied to a phase sensitive rectifier (PSR) 54. The PSR 54 converts the alternating LVDT signals into a corresponding DC voltage together with ripple components at the even harmonics of the LVDT primary frequency. A filter 55 reduces these ripple voltages.

The interface utilises a stable reference frequency from an external master clock oscillator 56 and a phase locked loop (PLL) technique to generate the primary sinewave at a stable frequency and to synchronise the digitisation process. The PLL consists of a phase detector 61, low pass filter 60, a voltage controlled sinewave oscillator 59, and a high hysteresis amplifier 62. The phase of the PSR synchronisation signal relative to the carrier can be adjusted by phase network 58 and amplifier 57. This phase lock technique reduces the effects of the high frequency ripple which appear at the output of the PSR 54 and gives consistently improved accuracy.

Each cycle of the LVDT primary voltage, a sample of the rectified, filtered LVDT secondary signal is taken by the sample and hold unit 63. The sample and hold control signal 64 is derived from the master clock and is synchronised to the primary voltage of the LVDT by the PLL to coincide with the zero voltage of the principal ripple component and thus give a reduced noise component. The sample is then held constant at the output of 63 whilst a successive approximation analogue to digital converter 65 generates the corresponding digital representation of the signal (the converter has a "start conversion" input 66 and a "busy" output 67).

The resultant digital signal is read into the main microprocessor 18 each period of the primary winding signal, using interrupts. The microprocessor 18 determines the integral of the readings over a fixed time period 0−Ts, in accordance with the formula above. The integration of the ramp displacement must cover the whole period the object 9 is in contact with the ramp 2 and any ramp settling time. An optical sensor (quadrant detector) 22 detects the entry of the object 9 to the ramp system and initialises the integration process. The sensor interface is shown at 68, the input 69 being "acknowledge object fed" and the output 70 being "object feed".

The ramp displacement is influenced by the impact of the object 9 and also the vibrational motion of the machine. The latter effect must be minimised to guarantee high accuracy of estimation of object weight. This is accomplished using a destructive interference technique.

The accelerometer 19 detects the machine's vibrational motion. The accelerometer signal is processed through an analogue model 19a of the ramp dynamics (which includes a variable gain element 72 and an electrical model 73 of the ramp dynamics having a variable damping coefficient and a variable natural frequency) to give a signal corresponding to the anticipated motion of the ramp 2. The ramp model output signal is added at 74 (20 in FIG. 1) anti-phase to the actual rectified ramp signal to substantially reduce the effect of mechanical noise.

FIG. 5

(charge coupled optical sensor interface)

The exit trajectory of the object 9 from the ramp 2 is viewed by two linear optical sensors 23, 24. These sensors 23, 24 are charge coupled devices (CCD) where incident light generates charge on a number of linearly displaced photosites. The charges (analogue) on all photosites can be inspected by transferring them to another register. This register allows the charges to be serially shifted out and converted to the video photovoltages corresponding to a single line scan of the device.

The CCD's are dynamic and must be continuously driven. The drive circuitry 81 contains a master clock oscillator and a simple sequential timing system. This system also generates the reference frequency and sample/hold commands for the above LVDT interface 51.

The video outputs from each CCD consist of three distinct sections:
(a) SYNC period during which the accumulated photocharge is transferred from photosites to the transfer register.
(b) REFERENCE period during which the output video signal shows the dark, or unilluminated level.
(c) ACTIVE VIDEO period during which the CCD shows a signal relating to the incident light in the field of view. The CCD is normally illuminated and thus the projectile is seen as a dark silhouette.

The video CCD signals are clamped to a fixed 'black' level reference (82) during the REFERENCE period, driven by a clamping drive from the CCD drive circuitry 81. This removes any drift effects and production tolerances from the following processing stages. The clamped signal is amplified at 83 and applied to a fast comparator 84. The peak 'white' level of the signal is sampled during the ACTIVE VIDEO period and applied to the other input of the comparator via an adjustable attenuator (white level reference) 85. This allows the white to black threshold of the video system to be adjusted for optimal performance. The comparator output is digitised and forced to a white level (i.e. no projectile in field of view) during the non active video periods, by a blanking pulse.

Each video scan of the CCD 23, 24 produces 256 digital levels relating to the 256 photosites in the respective CCD 23, 24. This digitised video is applied to a memory (256×256 bits) 86 which stores the signals for 256 scans of the respective CCD 23, 24. The video scan is only stored when a video line contains an active pixel (i.e. projectile in view) and continues to store the next sequential 256 lines. Each CCD pixel memory 86 thus stores a data map representing the projected silhouette of the object 9 as it passes the respective CCD.

The position of the minimum and maximum active pixel in a row is also generated using a row byte memory (256 bytes) 87. This memory 87 is zeroed prior to the arrival of the object 9. On each line scan, any active pixel sets a corresponding byte of the row memory 87. Thus, at the completion of the 256 line scan, the row memory 87 indicates the minimum and maximum active pixel of the row.

The position of the maximum active line scan is generated in the same way using a column memory (256 bytes) 88. The line scan does not proceed unless an active pixel is seen in the first line and thus the minimum active column position is always zero (i.e. first line).

The position of the row and column minimum and maximum active pixels are used to bound the active area (i.e. area of interest) of the video memory and so maximise speed in the image analysis and checking procedures.

Each two-dimensional pixel memory 86 is addressed by 8 bit row and column counters 89 which also address the row and column byte memories 87, 88 with the incorporation of multiplexers 90 controlled by the bitslice scanning controls 91. The counters 89 are shown with a counter control bus 92, and are either controlled by the CCD drive circuit during scanning, or by the bitslice processor (see below) during image analysis.

Each individual CCD interface has its own signal processing, video memory and addressing counters 89. This allows the CCD 23 pixel memory to be analysed by the bitslice whilst the CCD 24 memory is still acquiring data, to minimise total image processing time. Status lines (video status processing 93, video status 94) inform the bitslice and microprocessor 18 of the state of the scanning (e.g. any data seen by CCD 23 or CCD 24, scan complete etc.).

The "pixel data" output 95 and bitslice buses 96 are shown.

FIG. 6

(bitslice processor system)

The bitslice processor is a customised 'fast' processor designed to allow rapid image checking, analysis and centroid calculation of the data in the CCD pixel memories 86–88. The bitslice program is held in a fast 1K×88 wide read only memory (ROM) 101 associated with an 88 bit latch 102, and consists of up to 1024 instructions each consisting of 88 bits. Each 88 bit instruction can be considered in groups where each group controls a particular aspect of the system:

(a) Program flow—AM2910 sequencer 103. The sequencer 103 controls the program flow, non-sequential program steps via conditional calls to and returns from subroutines and conditional jumps. Immediate data can be provided for the sequencer call and jump address, or to the bitslice data bus 96 via buffer 104.

(b) Arithmetic logic unit control (ALU) (2 off AM2903) 106. The ALU 106 allows simple arithmetic operations to be completed including ADD (with/out carry), SUBTRACT (with/out carry), and contains 16 read/write memories (RAM) and a shift unit. The control lines select the ALU function, RAM address and shift control codes.

(c) Shift controller, status register and condition code selector (AM2904) 107. The shift controller 107 selects the most and least significant bits (MSB, LSB) for the ALU shift functions. The ALU 106 can shift both the output register and shift register and the selector allows various combinations of LSB and MSB setups. The status register allows the carry, zero, overflow and negative flags from the ALU 106 to be stored in one of two registers. The stored or direct flags can be subsequently used in conditional code program control by selection.

(d) Hardware status selector (2 off AM2922) 108. This device 108 allows selection of the various hardware flags for use in condition program control. The hardware flags include scan complete, data seen by CCD, data ready from microprocessor data buffer empty to microprocessor, etc.

(e) Counter control bus 92. These signals control the many counters in the bitslice system. Each CCD system has an X and Y counter. Each counter is controlled by an UP, ENABLE, and RESET signal.

(f) Scanning control 109 and tracker control 110. This group of signals controls the scanning to allow either or both CCD's 23,24 to be actively scanning at any time. The tracker can boundary track either CCD 23 or CCD 24 pixel memory and the control lines facilitate this selection.

(g) A "miscellaneous" output 111 is shown.

The bitslice system closely controls the CCD scanning, data acquisition, image checking, boundary checking and centroid calculation.

Following image acquisition, the bitslice initially checks the size of the minimum and maxmum active row address and the maximum column address. If any of these are erroneous, an appropriate error code is sent to the microprocessor 18 and no further analysis is completed. Possible errors include min/max too close to address extremes (i.e. part of image may be lost), maximum-minimum row address too large (i.e. object size excessive), maximum column address too large (i.e. object size excessive), etc.

Following these checks, the bitslice initialises the counters to column zero (line zero) and the row counter to the first active pixel on this line. The boundary tracker (FIG. 7) is then run to track the boundary of the projected silhouette. On completion, the new boundary is sequentially scanned and the centroid of the projected silhouette calculated. The resultant data is communicated to the microprocessor 18.

FIG. 7

(boundary tracker)

The pixel memory acquires the 2-D silhouette of the object 9. In the case of transparent or semi-transparent objects 9, this may have break-through (i.e. light passes through an inner region of the object 9, which can happen when the object 9 has parallel sides) and this would generally reduce the accuracy of centroid calculation. The boundary tracker removes this error by tracking around the outer boundary and generating a new silhouette with no break-through (note that in the rare case of edge break-through, this will not be detected and an error will occur). The new silhouette is drawn in the upper half of the pixel memory (column address greater than 128). The bitslice boundary checking guarantees this half memory contains no active data prior to the boundary track.

The action of the tracker is as follows. The bitslice selects the pixel memory to track and intialises the row counter to the first active pixel of line zero in the pixel memory. The tracker is then given control of the row and column counters. The complete cycle of the tracker is 8 clock periods controlled by an 8 state sequence.

The states are detailed below:

(1) Save the LSB of the row and column counters 89, via a selector 121 controlled by a tracker control 122, and a latch 123.

(2) Fetch data from adjacent pixel group determined by row and column LSB saved above, via a selector 124 controlled by a tracker control 125. Each group contains 4 pixels. Save data in data combiner 126, controlled by a sequencer 127 controller in turn by a tracker control 128.

(3) Repeat step 2 for next clockwise group and merge data to form total pixel information around our current pixel position.

(4) Repeat step 3 for next clockwise group.

(5) Repeat step 3 for next clockwise group.

(6) The data combiner 126 now contains the pixel content of all the pixels surrounding our current position. Save this data in the latch 129.

(7) Using the old direction (i.e. direction entered the current pixel) and the surrounding pixel data, generate the new direction (direction finder logic 130) to move to the next pixel. This is determined using a read only memory to cover all binary options. The direction algorithm guarantees the maximum boundary.

Latch the new direction 131.

(8) Move in the new direction to the new pixel. Signal to the bitslice that a cycle has been completed. Allow the bitslice to read the new row and column counters and check if the boundary has been completely traversed. Set the corresponding pixel in the upper half of the pixel memory (i.e. column address greater than 128). Repeat the cycle.

Once the whole boundary has been traversed, the bitslice regains control of the counters. The boundary drawn in the upper half of the pixel memory is now used to determine the centroid in both the row and column directions. The centroid is determined by selecting an arbitrary centre line, weighting each pixel according to its distance from the centre line (i.e. determining its moment about the centre line), summing the moments and dividing by the number of pixels.

Whilst calculating the centroids, the bitslice also looks for any pixels outside the boundary and indicates these as a double or multiple feed.

FIG. 7 also shows a state decoder 132 with a "tracker status" output 133, and selectors 134 and 135, the latter controlled by a tracker control 136.

FIG. 8

(16-bit microprocessor 18)

This is a general microprocessor which co-ordinates the whole weighing process. The central, 80186-type 16 bit processing unit (CPU) 141 is highly integrated and includes internal timers, direct memory controllers, wait state generators etc. The CPU 141 also offers multiplication and division functions at reasonable speed. The microprocessor program is contained in 16 Kilobytes of ROM in unit 142 and the system has 16 Kilobytes of RAM in unit 143. The CPU 141 can communicate and control the bitslice by a parallel interface 144. The LVDT digital ouput and status is also read by a parallel interface 145. The final weight is communicated to the host computer via a parallel inter-processor link (IPL) 146. This link also enables calibration and other data to be read by the microprocessor. A diagnostics interface 197 is shown, which can have suitable outputs or inputs such as a VDU.

ALTERNATIVES

Using a force transducer for sensing horizontal forces, one can operate according to the equation:

$$M = \frac{\int_0^{T_s} P \cdot dt}{V_1 - V_2}$$

where P is the force on the transducer. In this system, the ramp and the transducer are such that deflection under the impact of the object is negligible—i.e. the ramp and transducer would have a high natural frequency.

FIG. 9

Using a displacement transducer, the change in vertical momentum is measured, according to the equation:

$$M[(V_2 - V_1) - gT_s] = k \int_0^{T_s} y \cdot dt$$

(noting $V_1 = V_o \sin \theta \simeq V_o \theta$) where y is the instantaneous vertical deflection of the ramp 2.

FIG. 10

Using a displacement transducer, the change in vertical momentum is integrated according to the equation:

$$M\left[Y_s - V_1 T_s - \frac{gT_s^2}{2}\right] = k\left[\frac{y(T_s)}{\omega_n^2} + \frac{2\zeta}{\omega_n} \int_0^{T_s} y \cdot dt + \iint_0^{T_s} y \cdot dt\right]$$

where $T_s$ is the vertical distance of travel of the centroid of the object in time $T_s$;

$\omega_n$ is the undamped natural frequency of the ramp; and $\zeta$ is the damping factor on the ramp.

$T_s$ can be determined by a simple optical system at the exit (at distance $Y_s$).

FIG. 11

Similarly to FIG. 5, the change in horizontal momentum is integrated, according to the equation:

$$M[X_s - V_1 T_s] =$$

-continued $$k\left[\frac{x(T_s)}{\omega_n^2} + \frac{2\zeta}{\omega_n}\int_0^{T_s} x \cdot dt + \int\int_0^{T_s} x \cdot dt\right]$$

where $X_s$ is the horizontal distance travelled by the centroid in time $T_s$.

The systems of FIGS. 1, 2 and 9 to 11 are passive because they rely on the natural restoring force in the ramp suspension.

FIG. 12

This system is active. A restoring force coil 151 is used, the restoring force being proportional to the current in the coil 151. This enables the deflection to be larger with faster settling after weighing by varying the effective stiffness and damping of the system.

The change in horizontal momentum is integrated, according to the equation:

$$M[X_s - V_1 T_s] = \frac{P(T_s)}{\omega_n^2} + \frac{2\zeta}{\omega_n}\int_0^{T_s} P \cdot dt + \int\int_0^{T_s} P \cdot dt$$

The systems of FIGS. 1, 2, 9 and 10 can also be devised as active systems.

FIG. 13

The ramp is suspended on an air suspension such that it is free to move horizontally, with no natural restoring forces. The current in a coil 152 can be switched on to reposition at a null point, before and after weighing.

A conservation of momentum principle is used according to the equation:

$$M[X_s - V_1 T_s] = M_R X_R$$

where $X_R$ is the horizontal movement of the ramp in time $T_s$;
$M_R$ is the mass of the ramp.

The present invention has been described above purely by way of example, and modifications of detail can be made within the scope of the invention.

The idea of using the matched secondary windings of the transducer transformer 5, as described in relation to FIG. 4 above, is of general applicability and can be used in connection with any form of weighing or more generally in any circuit where displacement is sensed. Stated generally, the idea is to sense displacement by using a linear variable differential transformer having a core which moves in accordance with the displacement, a primary winding energised by a carrier signal, and two matched secondary windings in series, the output signal from the secondary windings corresponding to the displacement.

The idea of storing at the wall point of the ripple, as described in relation to FIG. 4 above, is of general applicability and can be used in any suitable circuit where a signal is being detected. Stated generally, the idea is to detect signal upon which a principal ripple component is imposed by taking a sample of the signal at the zero or mean voltage of the principal ripple component.

The idea of tracking around the boundary of the object to avoid error due to break-through, as described in relation to FIG. 7 above, is of general applicability. Stated generally, the idea is to determine a parameter of an object by a method which includes tracking around the boundary of an image of the object (thereby determining the profile of the object)—and using information derived from the boundary while ignoring information derived from parts of the image within the boundary in order to determine the parameter. This can be combined with the idea of passing the object roughly at right angles to a linear sensing device, in order to sense the image.

We claim:

1. Apparatus for weighing a number of discrete objects in spaced succession, comprising:
a reaction member having an object-contacting surface; means for directing each object in succession along a substantially predetermined engagement trajectory intersecting said object-contacting surface, whereby the object strikes said object-contacting surface and the line of travel of the object is changed through an angle substantially greater than 0° and substantially less than 180° by engagement of the object with the reaction member; and means for giving a signal which varies with the dynamic reaction of the reaction member to the impact thereon of the object.

2. The apparatus of claim 1, wherein said object-contacting surface of the reaction member is a concave surface which curves smoothly through a substantial angle, and the directing means is for directing each object in turn onto an initial part of the concave surface so that the object is guided through an angle by the concave surface.

3. The apparatus of claim 2, wherein the concave surface curves through 90°.

4. The apparatus of claim 2, wherein the concave surface is an arc of a circle.

5. The apparatus of claim 2, wherein the concave surface finishes vertically downwards.

6. The apparatus of claim 1, wherein said signal varies with the reaction of the reaction member in the horizontal direction.

7. The apparatus of claim 1, wherein the object leaves the reaction member during weighing.

8. The apparatus of claim 1, wherein said directing means is for directing the object substantially horizontally onto the reaction member.

9. The apparatus of claim 1, wherein said signal giving means gives a signal which varies with the dynamic reaction of the reaction member in a direction substantially parallel to said engagement trajectory.

10. The apparatus of claim 1, wherein said signal giving means gives a signal which varies with the dynamic reaction of the reaction member in a direction substantially at right angles to said engagement trajectory.

11. The apparatus of claim 1, and defining an object departure trajectory along which each successive object leaves the reaction member, said engagement and departure trajectories being substantially at right angles to each other.

12. The apparatus of claim 11, wherein one of said engagement and departure trajectories is horizontal and the other is vertical.

13. The apparatus of claim 11, wherein said signal giving means gives a signal which varies with the dynamic reaction of the reaction member in a direction substantially parallel to one of said engagement and departure trajectories.

14. The apparatus of claim 11, wherein one of said engagement and departure trajectories is substantially horizontal and the other of said engagement and departure trajectories is substantially vertical, and said signal giving means is for giving a signal which varies with the dynamic reaction of the reaction member in a substantially horizontal direction.

15. The apparatus of claim 1, and comprising means mounting the reaction member and permitting deflection of the reaction member on engagement by each successive object, said signal giving means giving a signal which varies with the deflection of the reaction member, and also comprising means for integrating the deflection of the reaction member with respect to time and thereby deriving a signal representative of the mass of each successive object.

16. The apparatus of claim 1, and further comprising electronic processor means receiving said signal which varies with the dynamic reaction of the reaction member, the electronic processing means integrating with respect to time said signal which varies with the dynamic reaction of the reaction member and thereby giving signals representative of the weight of each successive object.

17. The apparatus of claim 1, and further comprising electronic processor means receiving said signal which varies with the dynamic reaction of the reaction member, the electronic processing means integrating with respect to time said signal which varies with the dynamic reaction of the reaction member and thereby giving signals representative of the weight of each successive object, said integration integrating said signal from at least the instant the object engates the reaction member to the instant when the reaction member has come substantially to rest.

18. Apparatus for weighing a number of objects in succession, comprising:
   a reaction member;
   means for directing each object in succession onto the reaction member;
   means for giving a signal which varies with the dynamic reaction of the reaction member to the impact thereon of the object,
   and comprising means for giving a signal corresponding to the change in velocity of the object in a specific direction during its reaction with the reaction member.

19. The apparatus of claim 18, wherein the object leaves the reaction member during weighing, and the means for giving a signal corresponding to the velocity change comprises means for giving a signal corresponding to the velocity in a specific direction when the object contacts the reaction member, and means for giving a signal corresponding to the velocity of the object in said direction when it leaves the reaction member.

20. The apparatus of claim 18, wherein the object leaves the reaction member during weighing, the apparatus comprising an array of sensors acting as means for giving a signal corresponding to the velocity of the object when it leaves the reaction member.

21. The apparatus of claim 20, wherein the array of sensors comprises two linear optical sensors extending generally normal to the path of the objects and spaced apart along said path, and means for determining the time to pass from one sensor to the other and for determining the change in position at right angles to said path from one sensor to the other.

22. The apparatus of claim 21, and comprising means for tracking around the boundary of the image of the object as it passes each sensor and on the basis of such tracking determining the centroid of the object in the direction of the linear sensor and in the direction at right angles thereto.

23. The apparatus of claim 18 wherein the means for giving a signal which varies with the reaction of the reaction member comprises a displacement transducer associated with the reaction member and in the form of a linear variable differential transformer having a core associated with said reaction member a primary winding and two matched secondary windings in series, means being provided for energizing the primary winding whereby an output signal from the secondary windings corresponds to the displacement of the reaction member.

24. The apparatus of claim 23, wherein the primary winding is energised by a cyclical carrier signal, the secondary winding output signal is rectified to a corresponding D.C. voltage having ripple components resulting from the primary winding carrier signal, and a sampling means takes a sample of the secondary windings output signal each cycle of the primary winding carrier signal, which sample is synchronised to the primary winding carrier signal to coincide with the zero voltage of the principal said ripple component.

25. A method of weighing a number of discrete objects in spaced succession, comprising directing each object in turn onto a reaction member whereby the line of travel of the object is substantially changed by engagement of the object with the reaction member, giving a signal which varies with the dynamic reaction of the reaction member to the impact thereon of the object, and thereby deriving a signal representative of the mass of the object.

26. The method of claim 25, wherein the objects are gem stones.

* * * * *